United States Patent
Shim et al.

(10) Patent No.: US 11,108,306 B2
(45) Date of Patent: *Aug. 31, 2021

(54) GROUND TERMINAL, COVER ASSEMBLY AND MOTOR COMPRISING SAME

(71) Applicant: LG INNOTEK CO., LTD., Seoul (KR)

(72) Inventors: Woo Seob Shim, Seoul (KR); Seong Hun Oh, Seoul (KR); Namu Jo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/917,240

(22) Filed: Jun. 30, 2020

(65) Prior Publication Data

US 2020/0336049 A1    Oct. 22, 2020

Related U.S. Application Data

(63) Continuation of application No. 16/308,733, filed as application No. PCT/KR2017/000270 on Jan. 10, 2017, now Pat. No. 10,734,872.

(30) Foreign Application Priority Data

Jun. 9, 2016  (KR) .................. 10-2016-0071817
Oct. 18, 2016 (KR) .................. 10-2016-0135168

(51) Int. Cl.
*H02K 11/40*    (2016.01)
*H01R 4/66*     (2006.01)
(Continued)

(52) U.S. Cl.
CPC .............. *H02K 11/40* (2016.01); *H01R 4/66* (2013.01); *H02K 5/22* (2013.01); *H02K 5/225* (2013.01); *H02K 13/105* (2013.01)

(58) Field of Classification Search
CPC .......... H02K 11/40; H02K 5/22; H02K 5/225; H02K 13/105; H01R 4/66
(Continued)

(56) References Cited

U.S. PATENT DOCUMENTS 3,686,609 A    8/1972  Hansen
5,281,876 A    1/1994  Sato
(Continued)

FOREIGN PATENT DOCUMENTS

CN    1269626 A    10/2000
CN    1338142 A    2/2002
(Continued)

OTHER PUBLICATIONS

International Search Report in International Application No. PCT/KR2017/000270, filed Jan. 10, 2017.
(Continued)

*Primary Examiner* — Terrance L Kenerly
(74) *Attorney, Agent, or Firm* — Saliwanchik, Lloyd & Eisenschenk

(57) ABSTRACT

An embodiment of the present invention relates to a cover assembly and a motor comprising same, the cover assembly comprising: a cover plate; a ground terminal disposed on the cover plate; and a capacitor connected to the ground terminal by means of a wire. The ground terminal comprises: a body unit; a ground unit bent from one area of the upper end of the body unit to a first direction; clip units extending from both sides of the body unit to a second direction which is opposite from the first direction; and a coupling unit extending from the lower part of the body unit. The wire is coupled to the clip units by means of insertion. Accordingly, the present invention enables the wire of the capacitor to be fixed in a temporarily assembled state and thus enables an automation process during assembly of the motor.

18 Claims, 15 Drawing Sheets

(51) Int. Cl.
*H02K 5/22* (2006.01)
*H02K 13/10* (2006.01)

(58) Field of Classification Search
USPC .................................................... 310/71, 72
See application file for complete search history.

(56) References Cited

U.S. PATENT DOCUMENTS

| | | | |
|---|---|---|---|
| 6,300,696 | B1 | 10/2001 | Wong |
| 6,768,243 | B1 | 7/2004 | Yamazaki et al. |
| 10,734,872 | B2 * | 8/2020 | Shim .................... H02K 13/105 |
| 2001/0007401 | A1 | 7/2001 | Walther et al. |
| 2017/0271959 | A1 | 9/2017 | Wallrafen et al. |

FOREIGN PATENT DOCUMENTS

| | | |
|---|---|---|
| DE | 10 2006 026 477 A1 | 12/2007 |
| DE | 10 2012 006 499 A1 | 10/2013 |
| DE | 10 2014 217 933 A1 | 3/2016 |
| JP | 07-115747 A | 5/1995 |
| JP | 2000-270522 A | 9/2000 |
| JP | 2002-320357 A | 10/2002 |
| JP | 2016-025679 A | 2/2016 |
| KR | 10-1998-0061939 A | 10/1998 |

OTHER PUBLICATIONS

Supplementary European Search Report dated Dec. 10, 2019 in European Application No. 17810446.9.
Office Action dated Dec. 30, 2019 in Chinese Application No. 201780035637.6.
Office Action dated Jan. 10, 2020 in U.S. Appl. No. 16/308,733.
Notice of Allowance dated Apr. 2, 2020 in U.S. Appl. No. 16/308,733.

* cited by examiner

GROUND TERMINAL, COVER ASSEMBLY AND MOTOR COMPRISING SAME

CROSS-REFERENCE TO RELATED APPLICATIONS

This application is a continuation of U.S. patent application Ser. No. 16/308,733, filed Dec. 10, 2018, which is the U.S. national stage application of International Patent Application No. PCT/KR2017/000270, filed Jan. 10, 2017, which claims the benefit under 35 U.S.C. § 119 of Korean Patent Application Nos. 10-2016-0071817, filed Jun. 9, 2016, and 10-2016-0135168, filed Oct. 18, 2016, the disclosures of each of which are incorporated herein by reference in their entirety.

TECHNICAL FIELD

The present invention relates to a ground terminal, a cover assembly, and a motor including the same.

BACKGROUND ART

Generally, a motor includes a rotating shaft which is rotatably disposed, a rotor coupled to the rotating shaft, and a stator fixed to an inner surface of the housing, and the stator is installed to be spaced apart from the rotor along a circumference of the rotor.

The motor induces rotation of the rotor through electric interaction. When a coil is wound around the rotor, a commutator and a brush are provided to supply a current to the coil wound around the rotating rotor.

Generally, the commutator is coupled to the rotating shaft in a state of being connected to the coil and rotates, and the brush is coupled to the housing and disposed to be in contact with the commutator. Here, the brush comes into contact with the commutator and supplies electricity.

In the commutator, since polarity portions are formed at fine intervals to induce an instantaneous change in an electrode, a spark discharge occurs when the polarity portions are frictionally connected to the brush, and thus noise is generated. In order to inhibit the noise, a filter is installed.

The filter may include a capacitor. The capacitor has to emit the noise through a ground terminal. To this end, a wire of the capacitor is connected to the ground terminal. Here, the wire of the capacitor is directly welded while being placed on the ground terminal.

Accordingly, a problem may occur wherein the wire of the capacitor is separated from the ground terminal by an external force.

DISCLOSURE

Technical Problem

The present invention is directed to providing a ground terminal and a cover assembly, which have an improved coupling force with respect to a wire of a capacitor, and a motor including the same.

Problems desired to be solved by the present invention are not limited to the above-described problems, and other problems not mentioned above may be clearly understood by those skilled in the art from below.

Technical Solution

One aspect of the present invention provides a ground terminal including a body unit, a ground unit bent in one region of an upper portion of the body unit in a first direction, clip units extending from both sides of the body unit in a second direction which is a direction opposite to the first direction, and a coupling unit extending from a lower portion of the body unit, wherein each of the clip units includes a body which has a plate shape and is connected to the body unit, two protruding units disposed to be spaced apart from each other at an upper portion of the body, and a seating groove which is formed between the protruding units and into which a wire is inserted.

The clip unit may further include fixing units protruding from the protruding units in directions which face each other.

Another aspect of the present invention provides a ground terminal including a body unit, a ground unit formed in the body unit, a clip unit formed in the body unit, and a coupling unit formed in the body unit, wherein a part of the body unit is cut and bent in a first direction to form the ground unit, and a part of the body unit is bent in a second direction which is a direction different from the first direction to form the clip unit into which a wire is inserted.

The clip unit may include a first clip and a second clip, which are disposed on both sides of the ground unit.

The first and second clips may be bent from an upper end of the body unit.

The first and second clips may be bent from a lower end of the body unit.

The first and second clips may be bent from side ends of the body unit.

The first and second clips may be formed by cutting and bending a part of the body unit.

The ground unit may be formed at a center of the body unit in a width direction.

The coupling unit may be formed to be coplanar with the body unit.

The coupling unit may further include a protrusion having a sawtooth shape.

Still another aspect of the present invention provides a cover assembly including a cover plate, a ground terminal disposed on the cover plate, and a capacitor electrically connected to the ground terminal through a wire, wherein the ground terminal includes a body unit, a ground unit bent in one region of an upper portion of the body unit in a first direction, clip units extending from both sides of the body unit in a second direction which is a direction opposite to the first direction, and a coupling unit extending from a lower portion of the body unit, wherein each of the clip units includes a body which has a plate shape and is connected to the body unit, two protruding units disposed to be spaced apart from each other at an upper portion of the body, and a seating groove disposed between the protruding units, wherein the wire is seated in the seating groove.

The wire may be coupled to the clip units in an inserted and fitted manner.

The clip unit may further include fixing units protruding from the protruding units in directions which face each other.

The ground unit may be formed at a center of the body unit in a longitudinal direction.

The coupling unit may be formed to be coplanar with the body unit.

The coupling unit may further include a protrusion having a sawtooth shape.

The cover plate may further include a guide groove configured to guide coupling of the ground terminal when the coupling unit is coupled to the coupling groove.

The guide groove may be formed in a C-shape.

Yet another aspect of the present invention provides a cover assembly including a cover plate, a brush assembly coupled to the cover plate, a ground terminal coupled to the cover plate, and a capacitor coupled to the cover plate and connected to the ground terminal and the brush assembly, wherein the ground terminal includes a body unit, a ground unit formed by cutting a part of the body unit and bending in a first direction, a clip unit formed by bending a part of the body unit in a second direction which is a direction different from the first direction, and to which a wire is coupled by being inserted, and a coupling unit extending from the body unit and including a protrusion.

The cover plate may include a coupling groove which is concavely formed and into which the coupling unit is inserted.

The cover plate may further include a guide groove configured to guide coupling of the ground terminal when the coupling unit is coupled to the coupling groove.

The cover assembly may further include a connector to which an external power source is connected, and a terminal disposed in the connector may be electrically connected to the capacitor.

The terminal may be disposed to pass through the cover plate.

Yet another aspect of the present invention provides a motor including: a rotating shaft; a rotor coupled to the rotating shaft; a commutator coupled to the rotating shaft; a stator disposed outside the rotor; a housing accommodating the rotor, the commutator, and the stator; and a cover assembly which covers the housing, wherein the cover assembly includes a cover plate, a brush assembly disposed on the cover plate to be in contact with the commutator, a ground terminal disposed on the cover plate, and a capacitor connected to the ground terminal through a wire, wherein the ground terminal includes a body unit, a ground unit bent from one region of an upper portion of the body unit in a first direction, clip units extending from both sides of the body unit in a second direction which is a direction opposite to the first direction, and a coupling unit extending from a lower portion of the body unit, wherein each of the clip units includes a body which has a plate shape and is connected to the body unit, two protruding units disposed to be spaced apart from each other at an upper portion of the body, and a seating groove disposed between the protruding units, wherein the wire is seated in the seating groove.

The wire may be coupled to the clip units in an inserted and fitted manner.

Yet another aspect of the present invention provides a motor including a rotating shaft, a rotor coupled to the rotating shaft, a commutator coupled to the rotating shaft, a stator disposed inside the rotor, a housing disposed at an outside of the stator, and a cover assembly which covers the housing, wherein the cover assembly includes a brush assembly disposed to be in contact with the commutator; a capacitor connected to the brush assembly; and a ground terminal connected to the capacitor, wherein the ground terminal includes a body unit, a ground unit formed in the body unit, a clip unit formed in the body unit, and a coupling unit formed in the body unit, wherein a part of the body unit is cut and bent in a first direction to form the ground unit, a part of the body unit is bent in a second direction which is a direction different from the first direction to form the clip unit into which a wire is inserted, and the coupling unit is extended from the body unit and has a protrusion.

The cover assembly may further include a connector to which an external power source is connected, and a terminal disposed in the connector may be electrically connected to the capacitor.

The ground unit may come into contact with an inner surface of the housing.

Advantageous Effects

A ground terminal according to embodiments is provided with a clip unit so that a wire of a capacitor can be fixed in a pre-assembled state, thereby providing an advantageous effect in which an assembling process is simple.

A ground terminal according to embodiments is provided with a clip unit in which a wire of a capacitor can be coupled in an inserted and fitted manner, thereby providing an advantageous effect of increasing a coupling force between the capacitor and a ground terminal.

That is, the ground terminal can fix the wire of the capacitor so that the wire of the capacitor does not move, thereby enabling an automation process rather than manual operations.

Thus, the assembly process of a motor can be simplified through the automation process.

The present invention provides an advantageous effect of significantly reducing scraps of a sheet metal material forming a ground terminal by implementing a ground unit by cutting a part of an upper portion of a body unit and implementing clip units on both sides of a coupling unit, which is implemented on a lower portion of a body unit, with the coupling unit interposed therebetween.

MODES OF THE INVENTION

Figure 1:
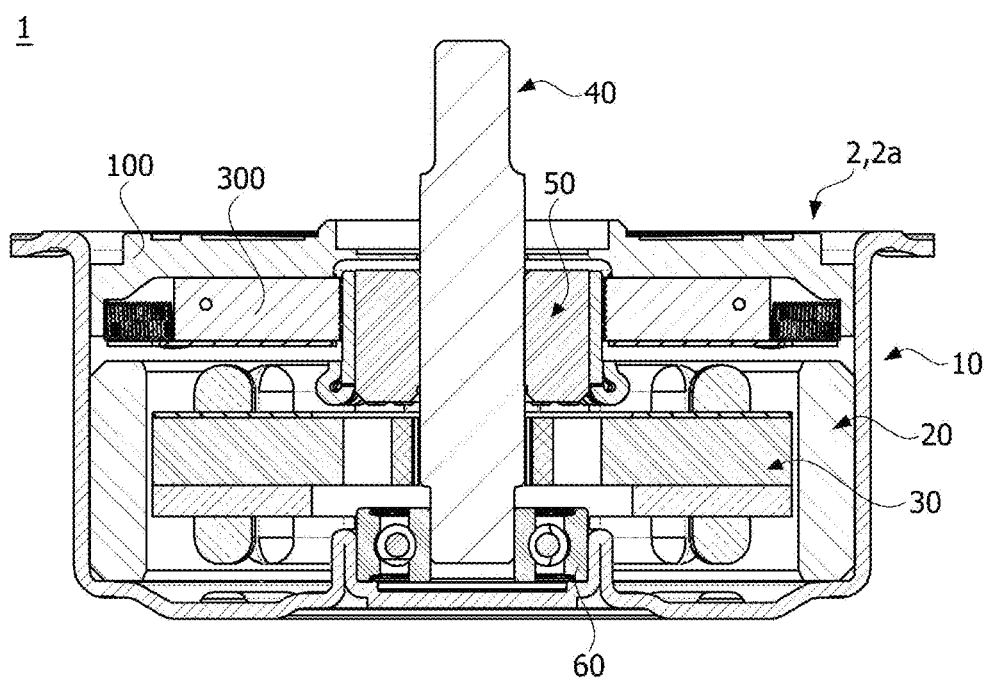
FIG. 1 is a view illustrating a motor according to embodiments.

Since the present invention may be variously changed and have various embodiments, embodiments will be exemplified in the drawings and described. However, the present invention is not limited to the particular embodiment, and includes all changes, equivalents, and substitutes falling within the spirit and the scope of the present invention.

Although the terms encompassing ordinal numbers such as first, second, etc. may be used to describe various elements, these elements are not limited by these terms. The terms are only used to distinguish one element from another. For example, a first element could be termed a second element, and similarly, a second element could be termed a first element without departing from the scope of the present invention. The term "and/or" includes combinations of one or all of a plurality of associated listed items.

When predetermined components are mentioned to be "linked," "coupled," or "connected" to other components, the components may be directly linked or connected to other components, but it should be understood that additional components may be "linked," "coupled," or "connected" therebetween. However, when the predetermined components are mentioned to be "linked," "coupled," or "connected" to other components, it should be understood that no additional components exist between the above-described components.

In the description of the embodiments, a term "on" or "under" in a case in which one predetermined component is disclosed to be formed "on" or "under" the other component includes both a case in which the two components are directly in contact with each other and a case in which at least one other component is formed to be disposed between the two components. Further, the term "on" or "under" may also include terms "upward direction" and "downward direction" with respect to one component.

The terminology provided herein is merely used for the purpose of describing particular embodiments and is not intended to be limiting of exemplary embodiments of the present invention. The singular form is intended to also include the plural form, unless the context clearly indicates otherwise. Throughout the application, it should be understood that the terms "comprise," "have," and the like are used herein to specify the presence of stated features, numbers, steps, operations, elements, components or combinations thereof, but do not preclude the presence or addition of one or more other features, numbers, steps, operations, elements, components, or combinations thereof.

Unless otherwise defined, all terms including technical or scientific terms used in the present invention have meanings the same as those of terms generally understood by those skilled in the art. Generally used terms defined in a dictionary should be interpreted to have meanings the same as meanings in the context of the related art and are not interpreted as ideal or excessively formal meanings unless the present invention clearly defines otherwise.

Hereinafter, the embodiments will be described in detail with reference to the accompanying drawings, the same reference numerals are applied to the same or corresponding components regardless of the drawing numerals and overlapping descriptions will be omitted.

FIG. 1 is a view illustrating a motor according to embodiments.

Referring to FIG. 1, a motor 1 according to the embodiments may include a cover assembly 2 or 2a, a housing 10, a stator 20, a rotor 30, a rotating shaft 40, and a commutator 50 according to the embodiment. Here, the cover assembly 2 or 2a may be disposed to cover an open upper portion of the housing 10.

The cover assembly 2 or 2a and the housing 10 may form an exterior of the motor 1.

Due to the cover assembly 2 or 2a and the housing 10 being coupled to each other, an accommodating space may be formed therein. Further, as shown in FIG. 1, the stator 20, the rotor 30, the rotating shaft 40, and the commutator 50 may be disposed in the accommodating space.

The stator 20 causes electric interaction with the rotor 30 to induce rotation of the rotor 30. The stator 20 is coupled to an inner surface of the housing 10, and the stator 20 may include a plurality of magnets. The magnets form a rotating magnetic field together with a coil wound around the rotor 30. The magnets may be disposed such that N and S poles are alternately positioned in a circumferential direction about the rotating shaft 40.

Meanwhile, the stator 20 may be manufactured by coupling a plurality of divided cores to each other or may be manufactured in the form of a single core composed of one cylinder.

The rotor 30 is disposed outside the stator 20. That is, the rotor 30 may be disposed inside the stator 20.

The rotor 30 may include a rotor core and the coil. The rotor core may be formed in a shape in which a plurality of plates, each in the form of a thin steel plate, are laminated to each other, but the present invention is not necessarily limited thereto. For example, the rotor core may be formed as a single item.

A plurality of slots may protrude from an outer circumferential surface of the rotor core. The slots may be disposed to protrude in a radial direction with respect to a center of the rotor. Here, the slots may be disposed to face the magnets. In addition, the coil is wound around each of the slots. Here, an insulator may be mounted on the slot. The insulator insulates the slot from the coil.

When a current is supplied to the coil, electrical interaction between the coil and the magnet is induced to rotate the rotor 30. When the rotor 30 rotates, the rotating shaft 40 also rotates. Here, the rotating shaft 40 may be supported by a bearing 60.

Hereinafter, a cover assembly 2 according to a first embodiment will be described with reference to FIGS. 2 to 8.

Figure 2:
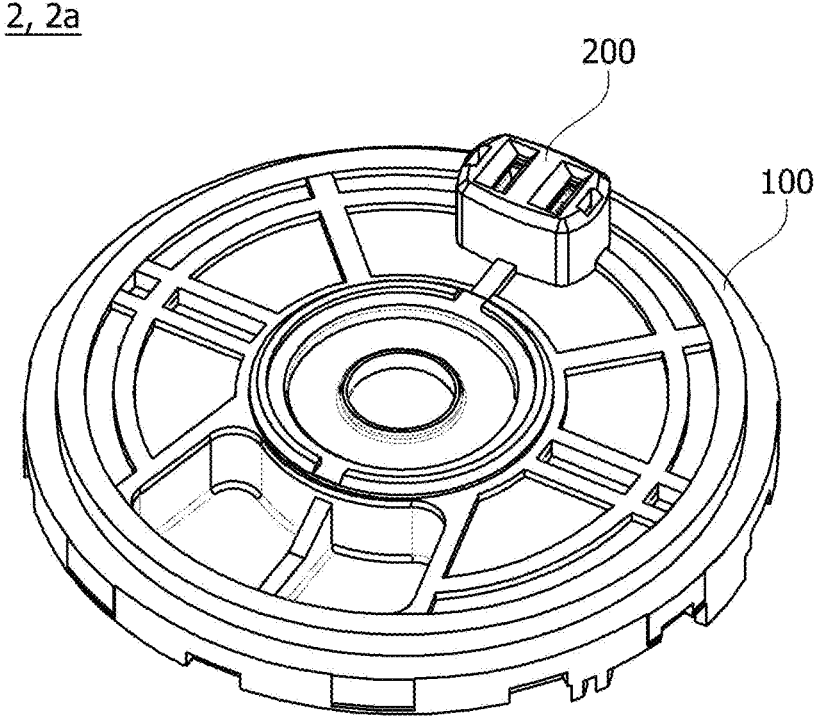
FIG. 2 is a perspective view illustrating a cover assembly according to embodiments.
Figure 3:
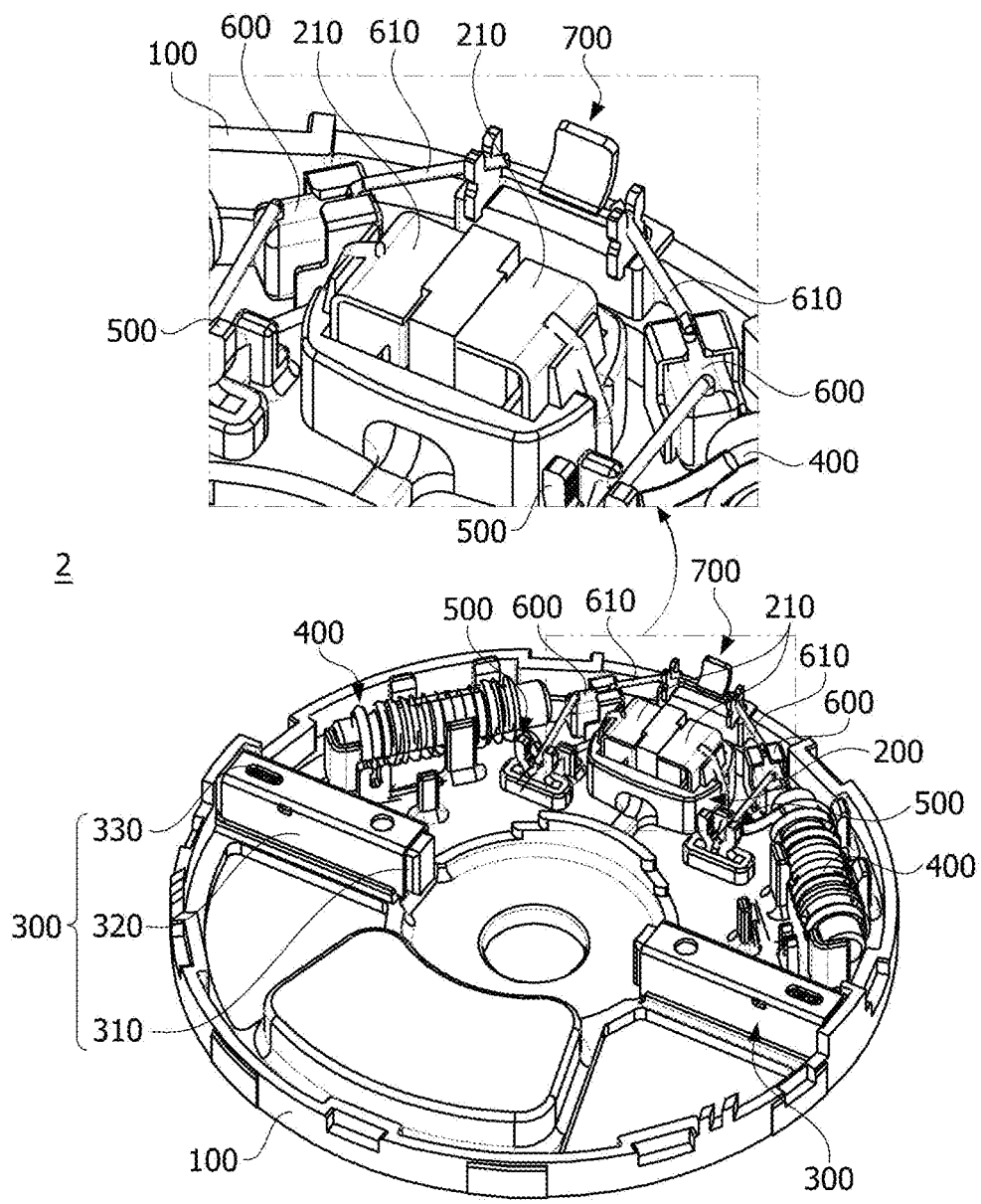
FIG. 3 is a bottom perspective view illustrating a cover assembly according to a first embodiment.

FIG. 2 is a view illustrating an upper surface a cover plate, and FIG. 3 is a view illustrating a lower surface of a cover assembly according to the first embodiment.

The cover assembly 2 according to the first embodiment will be described with reference to FIGS. 2 and 3, wherein the cover assembly 2 may include a cover plate 100, a connector 200 having a terminal 210 disposed therein, a brush assembly 300, a choke coil 400, a hook terminal 500, a capacitor 600, and a ground terminal 700.

As shown in FIG. 3, the brush assembly 300, the choke coil 400, the hook terminal 500, the capacitor 600, and the ground terminal 700 may be disposed on a lower surface of the cover plate 100.

Further, the terminal 210 of the connector 200, the brush assembly 300, the choke coil 400, the hook terminal 500, the capacitor 600, and the ground terminal 700 may be electrically connected to each other. Here, the terminal 210, the choke coil 400, and the capacitor 600 of the connector 200 may be electrically connected to each other using a member, such as a wire, and the hook terminal 500.

The cover plate 100 may be disposed to cover the open upper portion of the housing 10. As shown in FIGS. 2 and 3, the cover plate 100 may be formed in a circular disk shape. In addition, the cover plate 100 may be formed of an insulating material such as a mold.

A ground terminal 700 may be disposed on the lower surface of the cover plate 100.

Further, the cover plate 100 may include a boss unit 110 disposed to protrude from the lower surface of the cover plate 100, a coupling groove 120 formed in the boss unit 110 so that one side of the ground terminal 700 is coupled thereto, and a guide groove 130 configured to guide coupling of the ground terminal 700.

Figure 4:
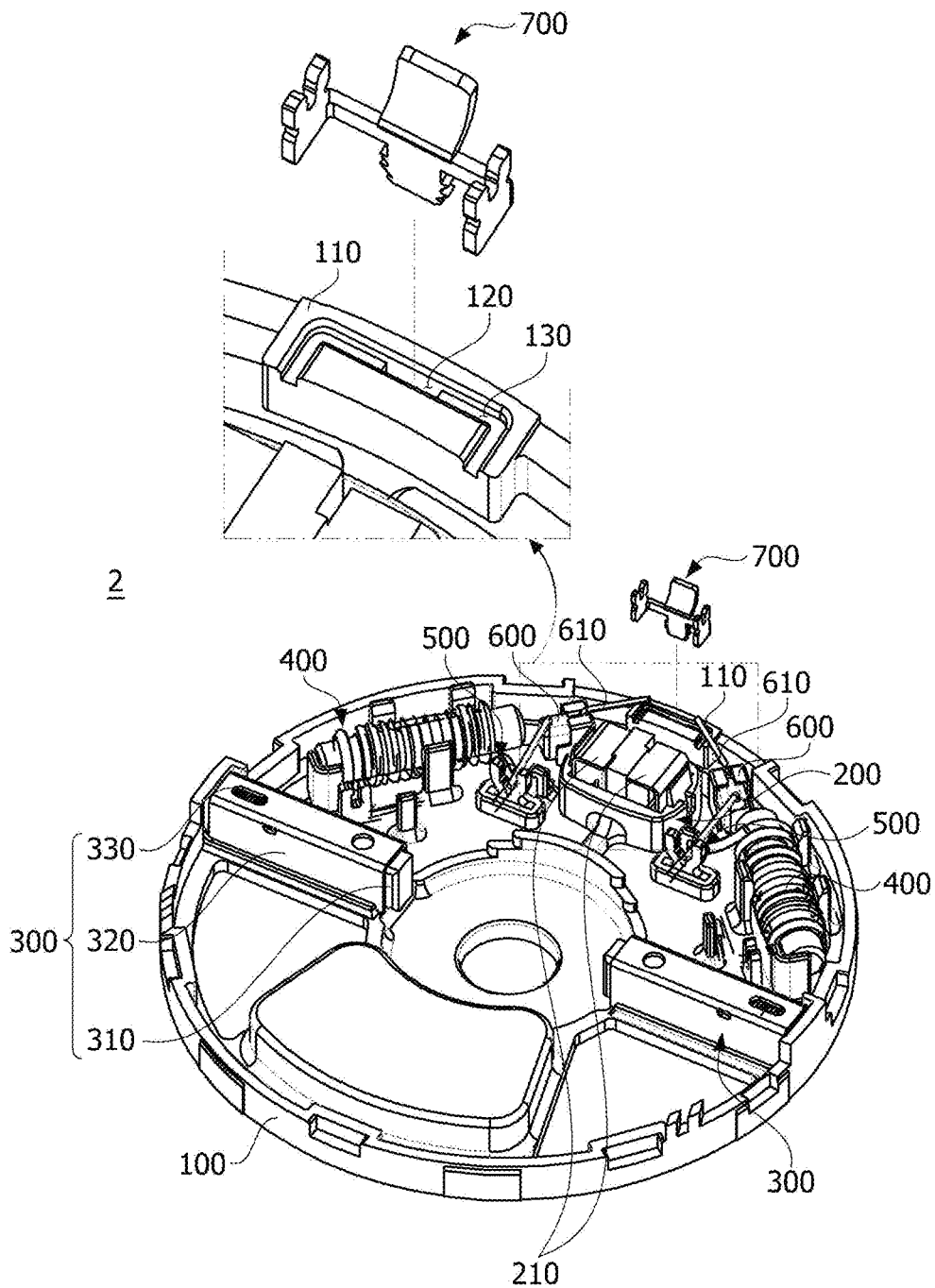
FIG. 4 is a view illustrating coupling of a ground terminal and a cover plate of the cover assembly according to the first embodiment.

Here, the guide groove 130 may be formed on the lower surface of the cover plate 100 in a C-shape. As shown in FIG. 4, the guide groove 130 may be formed in the boss unit 110 of the cover plate 100.

Accordingly, when the ground terminal 700 is assembled to the cover plate 100, the guide groove 130 may guide the coupling such that the ground terminal 700 is disposed at a predetermined position. Further, a side surface of the guide groove 130 may support the ground terminal 700.

The connector 200 allows power supplied from an external power supply device to be supplied to the motor 1. As shown in FIGS. 2 and 3, the connector 200 may be disposed to pass through the cover plate 100. A terminal 210 may be disposed in the connector 200. Accordingly, the power supplied from the outside may be supplied to the brush assembly 300 or the like of the motor 1 through the terminal 210.

The brush assembly 300 may include a brush 310, a case 320 including the brush 310 therein, and an elastic member 330 included in the case 320 to provide an elastic force. Accordingly, the brush 310 may be disposed to come into contact with the commutator 50. Thus, the brush 310 may transmit the power supplied through the commutator 50 to the coil.

Meanwhile, the brush assembly 300 is connected to one side of the choke coil 400. Further, the other side of the choke coil 400 is connected to the capacitor 600 through the hook terminal 500.

The choke coil 400 may shield electromagnetic waves which are emitted from the motor 1 to the outside.

The hook terminal 500 may be disposed between the connector 200 and the choke coil 400. Further, the hook terminal 500 may be electrically connected to the terminal 210 of the connector 200 and the choke coil 400.

The capacitor 600 may be electrically connected to the hook terminal 500. Further, the capacitor 600 may be electrically connected to the ground terminal 700 through a wire 610. Accordingly, the terminal 210 of the connector 200 to which an external power source is connected may be electrically connected to the ground terminal 700.

Further, the capacitor 600 may emit noise through the ground terminal 700.

The ground terminal 700 may be electrically connected to the capacitor 600.

Figure 5:
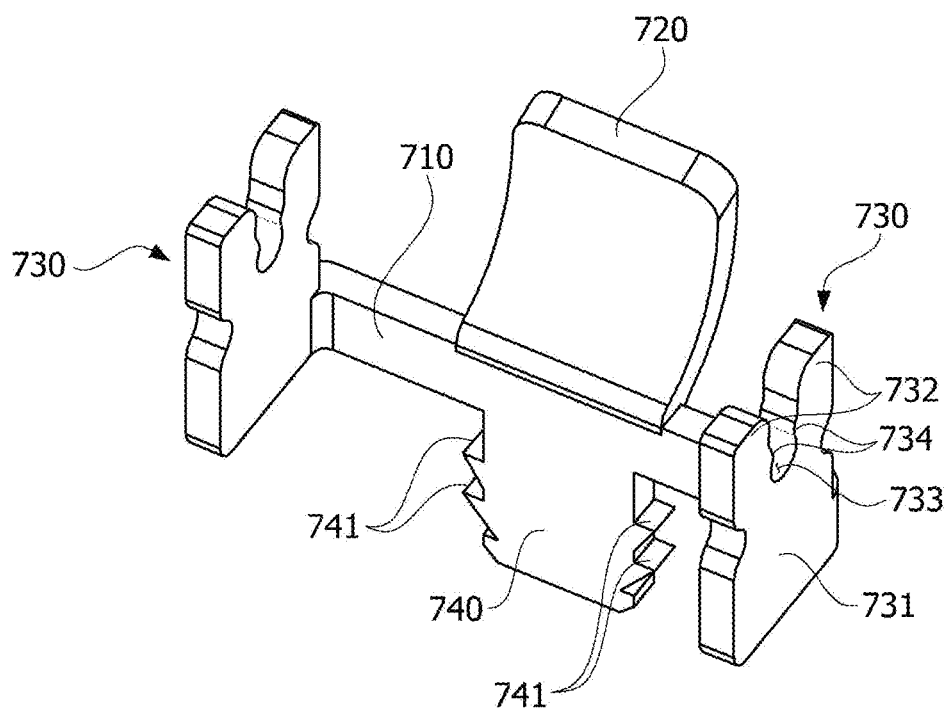
FIG. 5 is a perspective view of the ground terminal according to the first embodiment.
Figure 6:
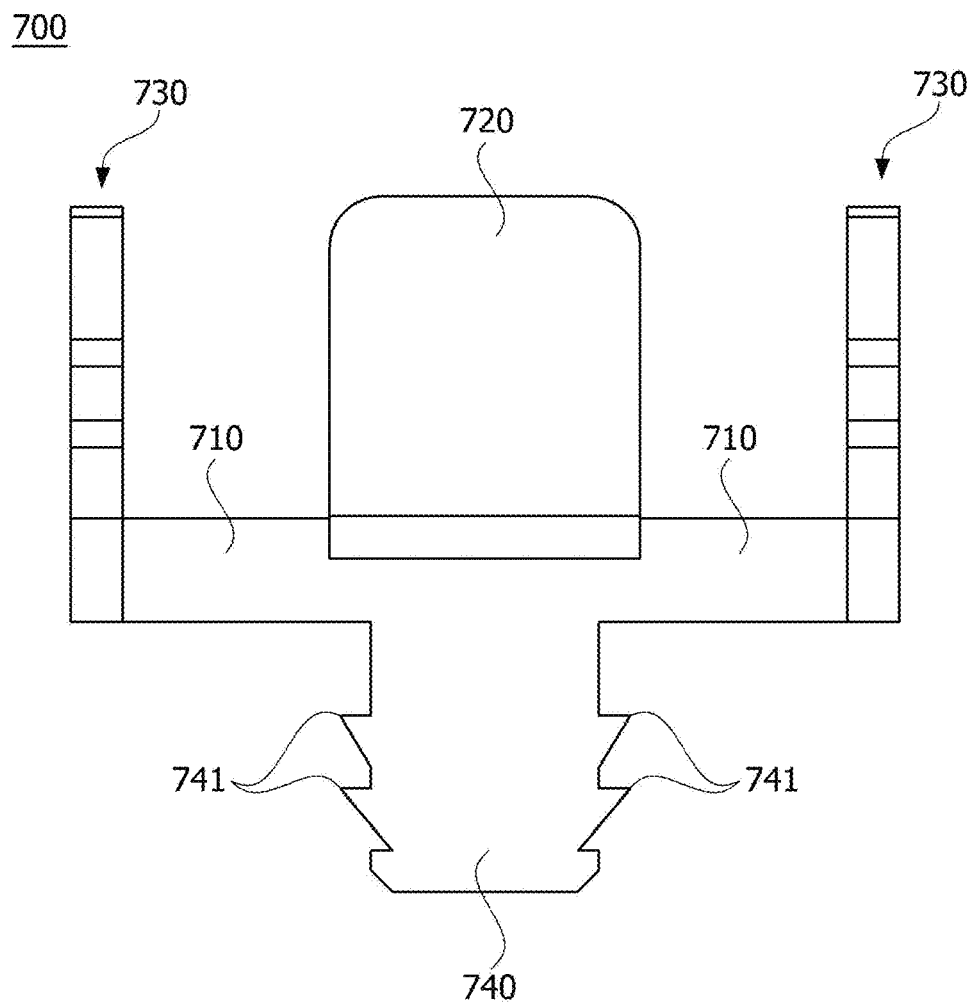
FIG. 6 is a front view of the ground terminal according to the first embodiment.
Figure 7:
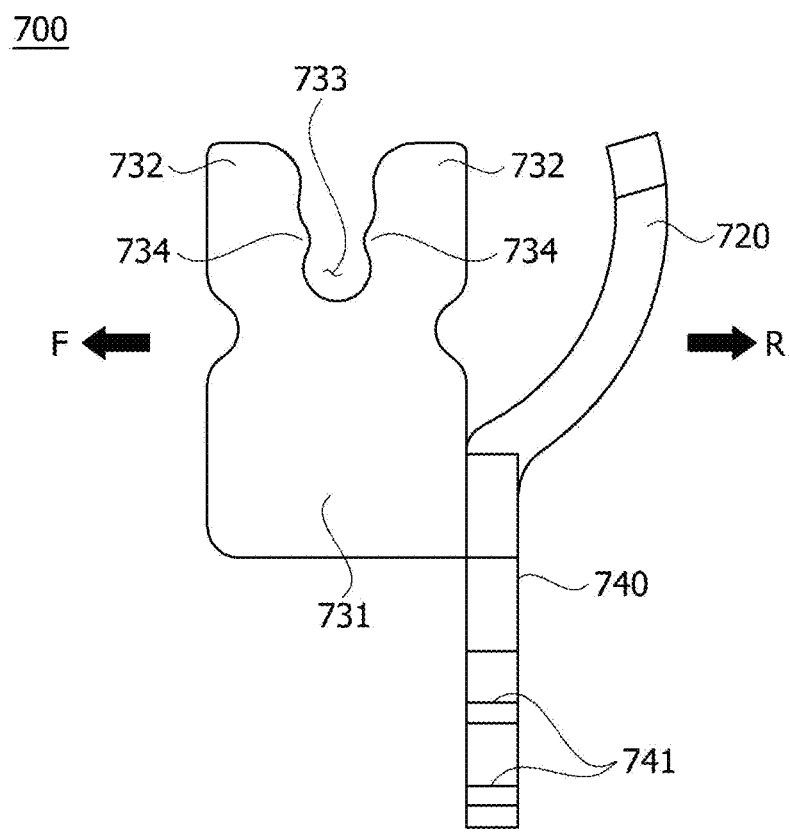
FIG. 7 is a side view of the ground terminal according to the first embodiment.

FIG. 5 is a perspective view of the ground terminal according to the first embodiment, FIG. 6 is a front view of the ground terminal according to the first embodiment, and FIG. 7 is a side view of the ground terminal according to the first embodiment. FIGS. 5 to 7 clearly illustrate only the main features in order to conceptually clearly understand the ground terminal according to the embodiments, and as a result, various modifications of the illustration are expected, and the scope of the embodiments need not be limited by the specific shape illustrated in the drawings.

Referring to FIGS. 5 to 7, the ground terminal 700 according to the first embodiment may include a body unit 710, a ground unit 720, clip units 730, and a coupling unit 740. Further, the body unit 710, the ground unit 720, the clip units 730, and the coupling unit 740 may be formed by bending a single sheet metal material. Here, the wire 610 of the capacitor 600 may be coupled to the clip unit 730 in an inserted and fitted manner.

The body unit 710 forms a body of the ground terminal 700. As shown in FIG. 5, the body unit 710 may be formed in a bar shape.

The ground unit 720 may be formed to extend from one region of an upper end of the body unit 710. Here, the ground unit 720 may be formed at a center of the body unit 710 in a longitudinal direction (width direction).

Further, the ground unit 720 may be bent in a first direction (R in FIG. 7). Here, the first direction (the R in FIG. 7) may be a direction toward the housing 10 with respect to the radial direction when the ground terminal 700 is coupled to the cover plate 100. Further, the ground unit 720 may be elastically deformed. Accordingly, the ground unit 720 may come into contact with the inner surface of the housing 10.

Figure 8:
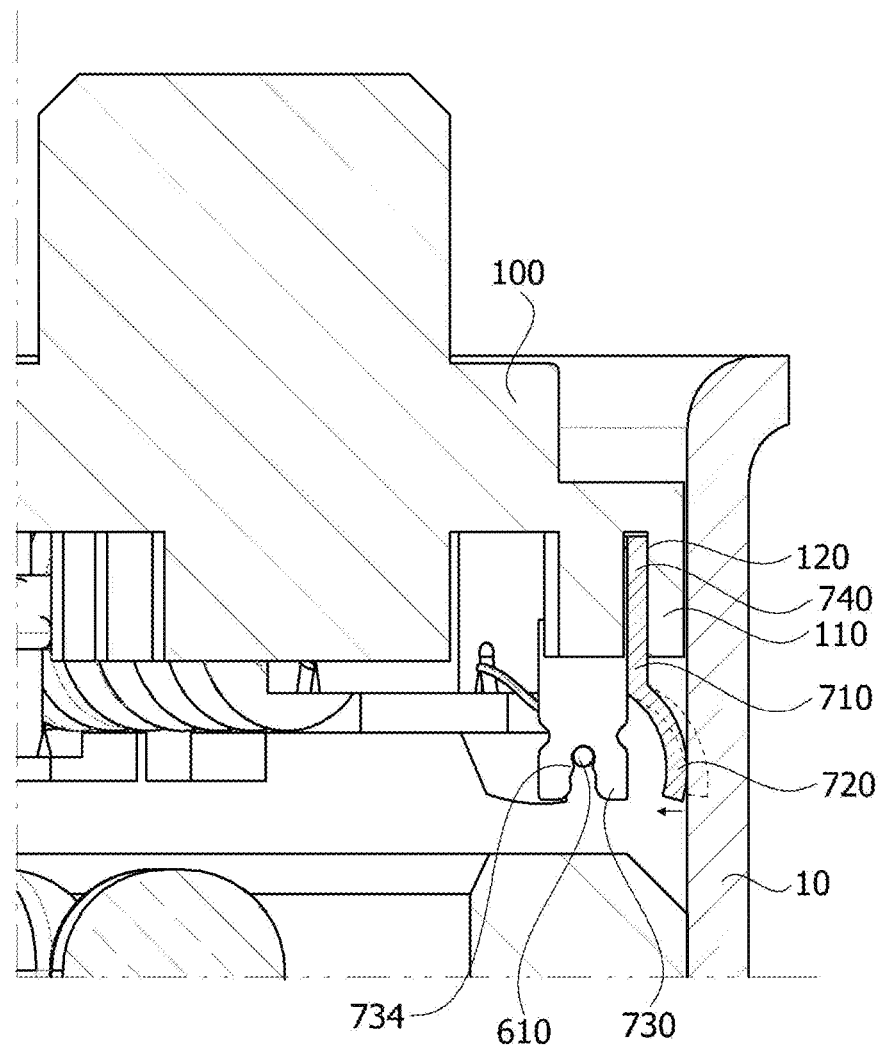
FIG. 8 is a view illustrating a ground unit, which comes into contact with a housing of the motor according to the embodiments, of the ground terminal according to the first embodiment.

Referring to FIG. 8, the wire 610 is connected to the clip unit 730 in a state in which the coupling unit 740 is coupled to the coupling groove 120 and a state in which the ground unit 720 comes into contact with the inner surface of the housing 10. The ground unit 720 is bent to form a curved surface so that the ground unit 720 is smoothly inserted into the inner surface of the housing 10 when the cover plate 100 covers the housing 10. Further, the ground unit 720 is elastically deformed when the cover plate 100 covers the housing 10.

The clip unit 730 may be formed by being bent from both side ends of the body unit 710 in a second direction (F in FIG. 7). Here, the second direction (the F in FIG. 7) may be a direction toward the rotating shaft 40 with respect to the radial direction when the ground terminal 700 is coupled to the cover plate 100. Thus, the second direction may be a direction opposite to the first direction.

When viewed from the upper portion of the ground terminal 700, the body unit 710 and the clip units 730 may be formed in a C-shape. Further, when the ground terminal 700 is coupled to the cover plate 100, the body unit 710 and the clip units 730 may be guided by the guide groove 130 to be disposed at the predetermined position. Further, the side surface of the guide groove 130 may support the body unit 710 and clip units 730 of the ground terminal 700. Here, the clip unit 730 may be disposed such that a part thereof is deviated from the boss unit 110 in the second direction. Specifically, the clip unit 730 may be disposed such that the part thereof is exposed from the guide groove 130 in the second direction.

Referring to FIGS. 5 to 7, the clip unit 730 may include a body 731, two protruding units 732 formed to extend from an upper portion of the body 731, and a seating groove 733 formed between the two protruding units 732. Further, the clip unit 730 may include fixing units 734 formed on the protruding units 732 to protrude in directions which face each other.

The body 731 is formed in a plate shape, and one side thereof may be connected to the body unit 710.

The protruding units 732 may protrude from the upper portion of the body 731. Further, since the protruding units 732 are disposed to be spaced apart from each other, the seating groove 733 may be formed between the protruding units 732.

The wire 610 may be seated in the seating groove 733. Here, the wire 610 may be seated in the seating groove 733 and then fixed to the clip units 730 by a method such as welding.

The wire 610 is fixed to the clip units 730 by a method such as welding, but the embodiment is not necessarily limited thereto. For example, when the fixing units 734 are formed, the wire 610 may be fixed to the seating groove 733 by the fixing units 734. Accordingly, movement of the wire 610 due to an external force may be inhibited.

That is, the fixing units 734 may inhibit the wire 610 disposed in the seating groove 733 from being separated therefrom.

Accordingly, when the wire 610 is inserted into the clip unit 730, a state in which the capacitor 600 is coupled to the ground terminal 700 is maintained, thus an inconvenience in which a worker has to hold the wire 610 for welding work may be eliminated. The structure in which the capacitor 600 is coupled to the ground terminal 700 as described above is a highly advantageous structure for implementing an automation process.

Further, since the wire 610 is fixed to the clip unit 730 by the fixing units 734, a separate welding work may not be required. However, the welding work may be performed in parallel to secure an electrical connection between the wire 610 and the clip unit 730.

The coupling unit 740 is formed to extend from a lower portion of the body unit 710. Further, the coupling unit 740 may be disposed to be coplanar with the body unit 710.

The coupling unit 740 is coupled to the cover plate 100. Specifically, the cover plate 100 may be provided with the protruding boss unit 110, and the coupling groove 120 concavely formed may be formed in the boss unit 110. Accordingly, the coupling unit 740 is inserted into the coupling groove 120 to fix the body unit 710 to the cover plate 100.

The coupling unit 740 may further include protrusions 741. The protrusions 741 increase a coupling force between the coupling unit 740 and the coupling groove 120. Here, each of the plurality of protrusions 741 is formed in a sawtooth shape, and thus it may be configured such that it is difficult for the coupling unit 740 to come out once it is inserted into the coupling groove 120.

Hereinafter, a cover assembly 2a according to a second embodiment will be described with reference to FIGS. 2 and 9 to 17.

In a description of the cover assembly 2a according to the second embodiment, the same components as those of the cover assembly 2 according to the first embodiment are denoted by the same reference numerals, and thus detailed descriptions thereof will be omitted.

Figure 9:
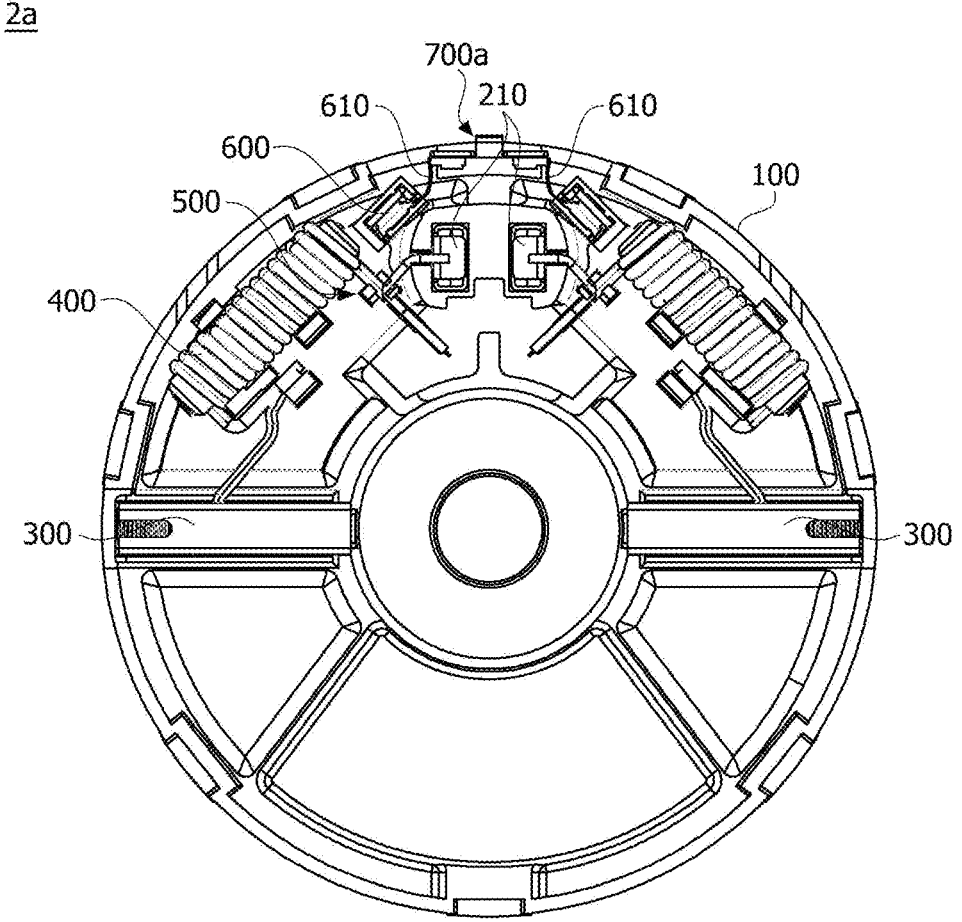
FIG. 9 is a bottom perspective view illustrating a cover assembly according to a second embodiment.
Figure 10:
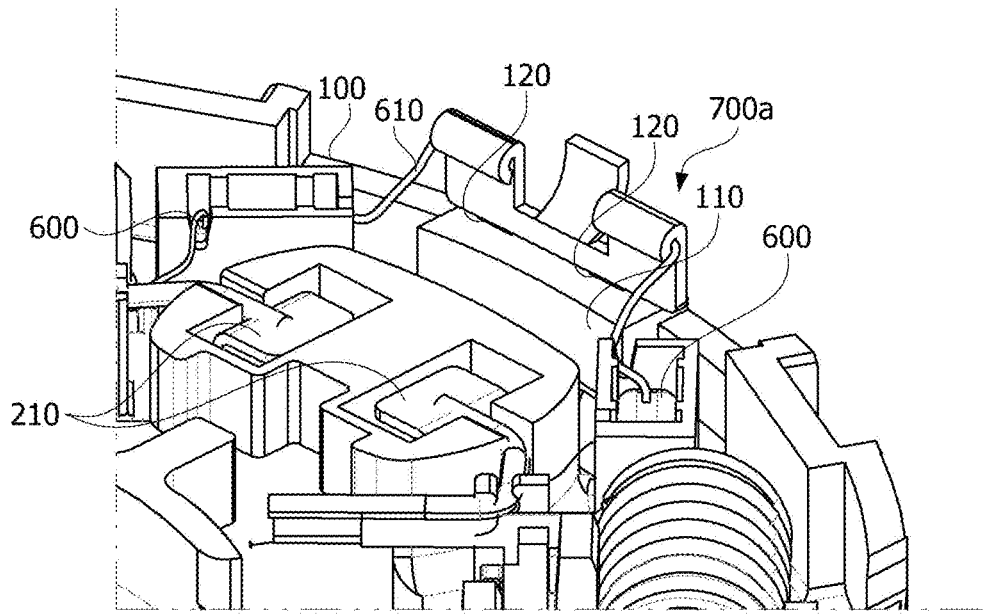
FIG. 10 is a view illustrating a ground terminal, into which a wire is inserted, according to the second embodiment.

FIG. 2 is the perspective view illustrating the cover assembly according to embodiments, FIG. 9 is a bottom perspective view illustrating a cover assembly according to the second embodiment, and FIG. 10 is a view illustrating a ground terminal, into which a wire is inserted, according to the second embodiment.

The cover assembly 2a according to the second embodiment will be described with reference to FIGS. 2, 9, and 10. The cover assembly 2a may include a cover plate 100, a connector 200 having a terminal 210 disposed therein, a brush assembly 300, a choke coil 400, a hook terminal 500, a capacitor 600, and a ground terminal 700a. Here, the ground terminal 700a may be provided as a ground terminal 700a according to the second embodiment shown in FIGS. 11 to 13.

As shown in FIGS. 9 and 10, the brush assembly 300, the choke coil 400, the hook terminal 500, the capacitor 600, and the ground terminal 700a may be disposed on the lower surface of the cover plate 100.

Further, the terminal 210 of the connector 200, the brush assembly 300, the choke coil 400, the hook terminal 500, the capacitor 600, and the ground terminal 700a may be electrically connected to each other. Here, the terminal 210, the choke coil 400, and the capacitor 600 of the connector 200 may be electrically connected to each other using a member, such as a wire, and the hook terminal 500.

For example, the ground terminal 700a and the brush assembly 300 are coupled to the lower surface of the cover plate 100. The brush assembly 300 is connected to the choke coil 400 and the capacitor 600. The wire 610 of the capacitor 600 is connected to the ground terminal 700a. Further, the capacitor 600 is connected to the terminal 210. The terminal 210 is disposed in the connector 200 formed on the upper surface of the cover plate 100. An external power source may be connected to the connector 200. When the external power is connected to the connector 200, electricity is supplied to the brush assembly 300 through the terminal 210, the capacitor 600, and the choke coil 400. The brush assembly 300 supplies the electricity to the coil by passing through the commutator 50.

The brush assembly 300 may include the brush 310, the case 320 including the brush 310 therein, and the elastic member 330 included in the case 320 to provide an elastic force. The brush 310 may be disposed to come into contact with the commutator 50.

Meanwhile, the brush assembly 300 is connected to one side of the choke coil 400. Further, the other side of the choke coil 400 is connected to the capacitor 600 through the hook terminal 500.

Referring to FIG. 10, the capacitor 600 is connected to the ground terminal 700a. The wire 610 of the capacitor 600 is inserted into the ground terminal 700a. The ground terminal 700a is coupled to the cover plate 100. The boss unit 110 including the coupling groove 120 into which the ground terminal 700a is inserted may be provided to protrude from the cover plate 100.

Figure 11:
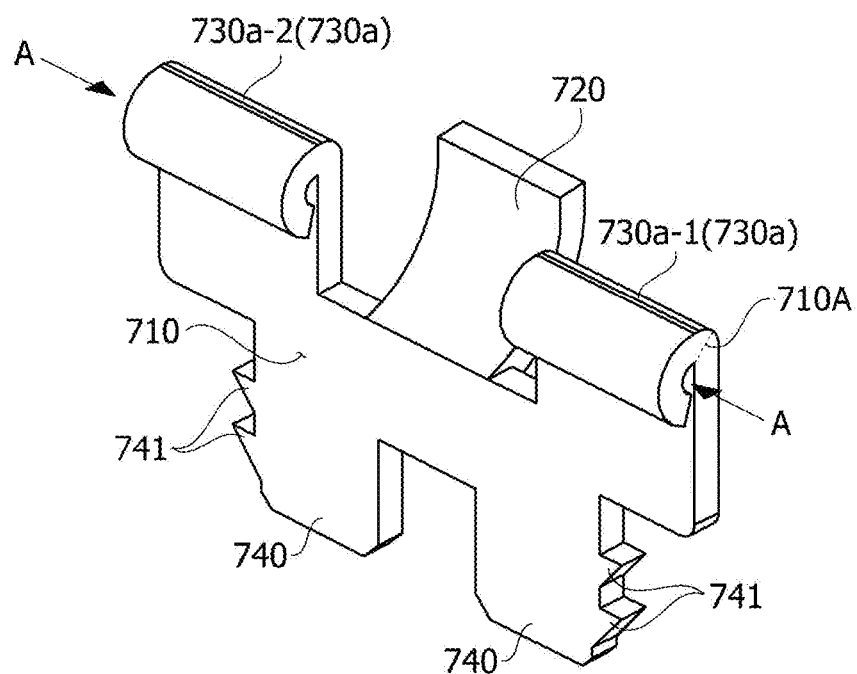
FIG. 11 is a perspective view of the ground terminal according to the second embodiment.
Figure 12:
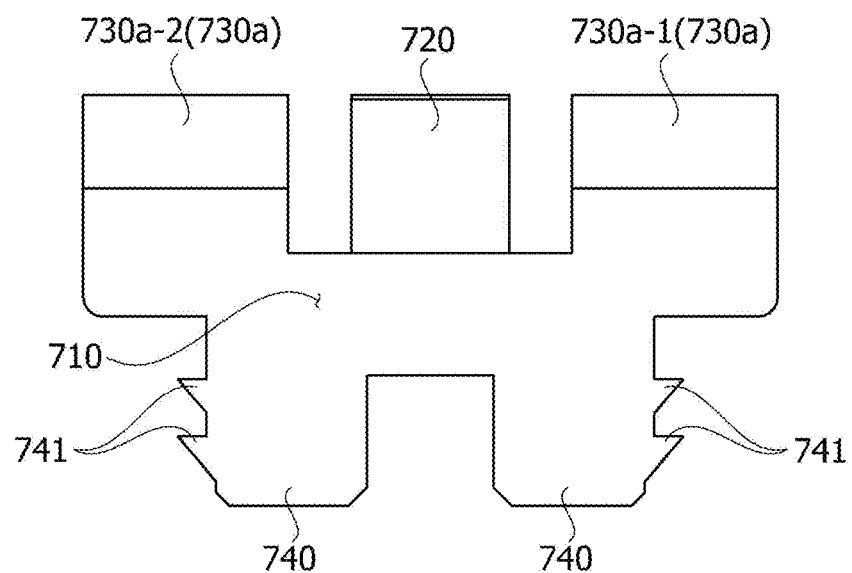
FIG. 12 is a front view of the ground terminal according to the second embodiment.
Figure 13:
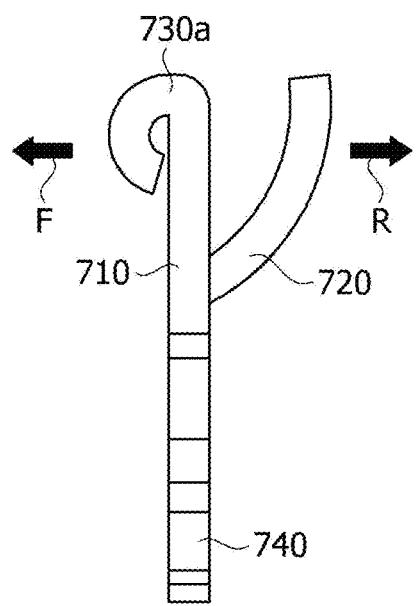
FIG. 13 is a side view of the ground terminal according to the second embodiment.

FIG. 11 is a perspective view of the ground terminal according to the second embodiment, FIG. 12 is a front view of the ground terminal according to the second embodiment, and FIG. 13 is a side view of the ground terminal according to the second embodiment. FIGS. 11 to 13 clearly illustrate only the main features in order to conceptually clearly understand the embodiments, and as a result, various modifications of the illustration are to be expected, and the scope of the embodiments need not be limited by the specific shape illustrated in the drawings.

Referring to FIGS. 11 to 13, the ground terminal 700a may include the body unit 710, the ground unit 720, clip units 730a, and the coupling unit 740. The body unit 710, the ground unit 720, the clip units 730a, and the coupling unit 740 may be separately described according to their shapes and functional properties but are one component vertically connected to each other. Further, the body unit 710, the ground unit 720, the clip units 730a, and the coupling unit 740 may be formed by bending a single sheet metal material.

The body unit 710 forms a body of the ground terminal 700a.

A part of an upper portion of the body unit 710 may be cut to an upper edge rim thereof, and the cut portion may be bent in a first direction (R in FIG. 13) to form the ground unit 720. Here, the first direction (R in FIG. 13) may be a direction toward the housing 10 with respect to a radius direction when the ground terminal 700a is coupled to the cover plate 100. The ground unit 720 is elastically deformed. Further, the ground unit 720 may come into contact with an inner surface of the housing 10.

The clip units 730a may be bent from an upper end 710a of the body unit 710 in a second direction (F in FIG. 13). Here, the second direction (the F in FIG. 13) may be a direction toward the rotating shaft 40 with respect to the radius direction when the ground terminal 700a is coupled to the cover plate 100.

The clip unit 730a may be bent to form a hole into which the wire 610 of the capacitor 600 is inserted. The wire 610 is inserted into the clip unit 730a in the same direction as A in FIG. 11. When the wire 610 is inserted into the clip unit 730a, a state in which the capacitor 600 is coupled to the ground terminal 700a is maintained, thus an inconvenience in which a worker has to hold the wire 610 for welding work may be eliminated. The structure in which the capacitor 600 is coupled to the ground terminal 700a as described above is a highly advantageous structure for implementing an automation process.

Meanwhile, the hole of the clip unit 730a may be processed in consideration of a diameter of the wire 610 such that the wire 610 does not move after the wire 610 is inserted into the clip unit 730a.

When there are two brush assemblies 300, the clip unit 730a may include a first clip 730a-1 and a second clip 730a-2. The ground unit 720 may be formed on a center of the body unit 710 in a width direction. Further, the first clip 730a-1 and the second clip 730a-2 may be disposed on both sides of the ground unit 720 with the ground unit 720 interposed therebetween.

The wire 610 of the capacitor 600, which is connected to one of the two brush assemblies 300, may be connected to the first clip 730a-1. The wire 610 of the capacitor 600, which is connected to the other one of the two brush assemblies 300, may be connected to the second clip 730a-2.

The coupling unit 740 is formed to extend from a lower portion of the body unit 710. The coupling unit 740 is coupled to the cover plate 100. Specifically, the cover plate 100 may be provided with the protruding boss unit 110 (see FIG. 10), and the coupling groove 120 (see FIG. 10) may be formed in the boss unit 110 (see FIG. 10). Accordingly, the coupling unit 740 is inserted into the coupling groove 120 (see FIG. 10) to fix the body unit 710 and the clip units 730 to the cover plate 100.

The coupling unit 740 includes the protrusions 741. The protrusions 741 increase a coupling force between the coupling unit 740 and the coupling groove 120 (see FIG. 10). The protrusions 741 are formed in a sawtooth shape, and thus it may be configured such that it is difficult for the coupling unit 740 to come out once it is inserted into the coupling groove 120.

Figure 14:
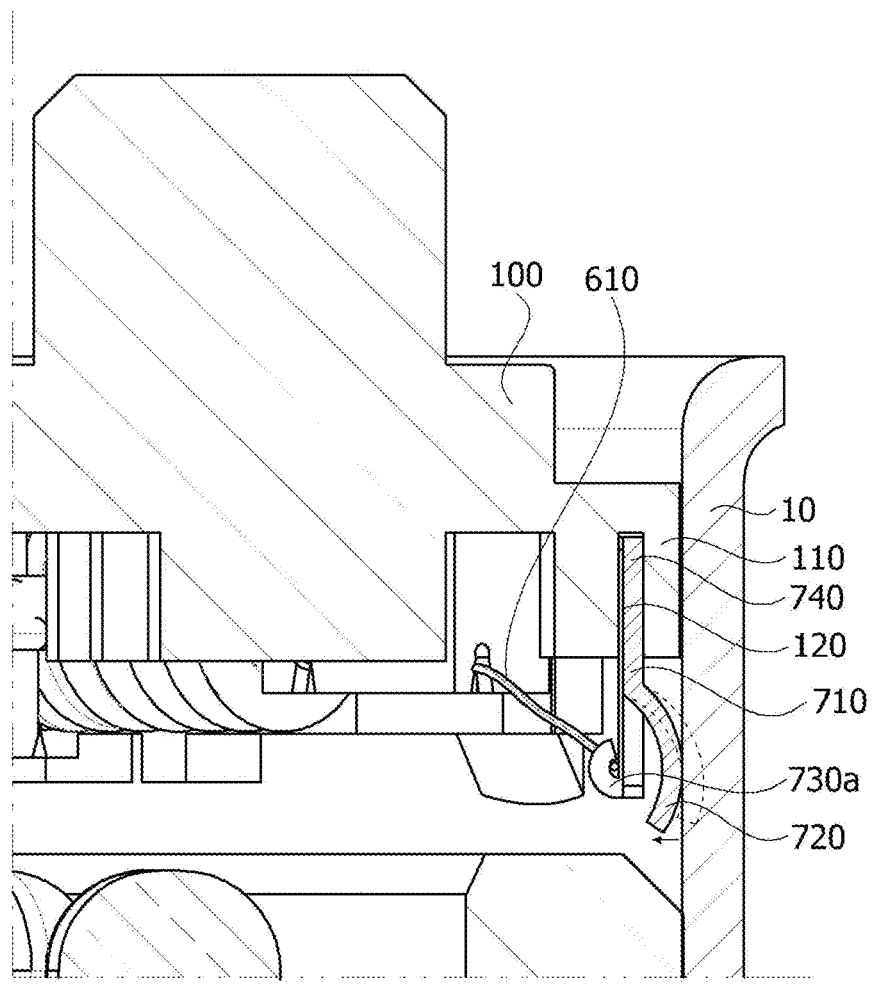
FIG. 14 is a view illustrating a ground unit, which comes into contact with the housing of the motor according to the embodiments, of the ground terminal according to the second embodiment.

FIG. 14 is a view illustrating a ground unit, which comes into contact with the housing of the motor according to the embodiments, of the ground terminal according to the second embodiment.

Referring to FIG. 14, the wire 610 is connected to the clip unit 730 in a state in which the coupling unit 740 is coupled to the coupling groove 120 and a state in which the ground unit 720 comes into contact with the inner surface of the housing 10. The ground unit 720 is bent to form a curved surface so that the ground unit 720 is smoothly inserted into the inner surface of the housing 10 when the cover plate 100 covers the housing 10. Further, the ground unit 720 is elastically deformed when the cover plate 100 covers the housing 10.

Figure 15:
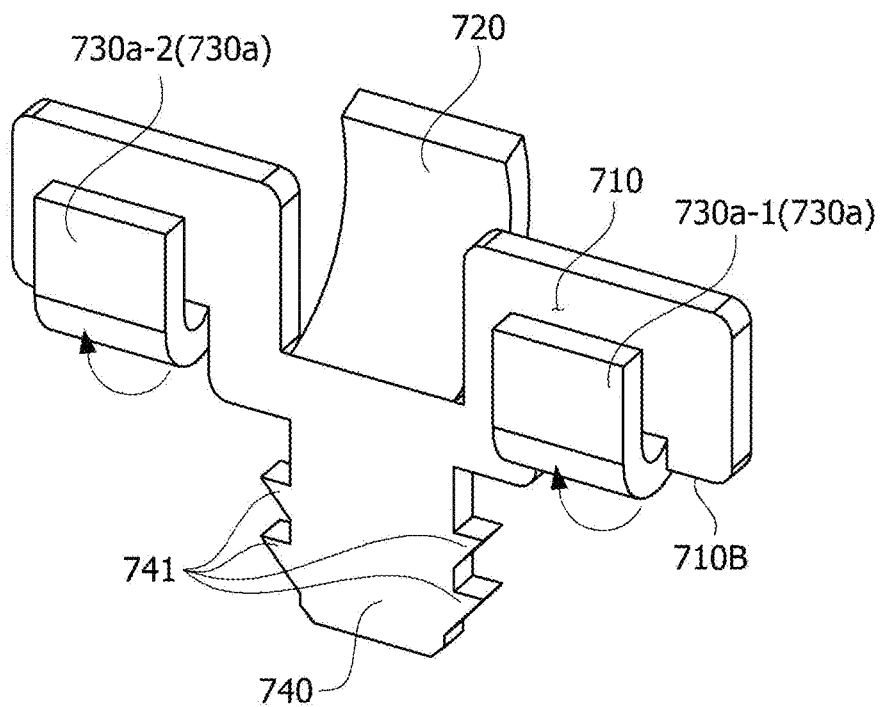
FIG. 15 is a view illustrating a first modified example of the ground terminal according to the second embodiment.

FIG. 15 is a view illustrating a first modified example of the ground terminal according to the second embodiment.

Referring to FIG. 15, in a ground terminal 700a according to the first modified example, a first clip 730a-1 and a second clip 730a-2 may be bent from a lower end 710B of a body unit 710. The first clip 730a-1 and the second clip 730a-2 are positioned on both sides of a coupling unit 740 with the coupling unit 740 interposed therebetween in an exploded shape of a ground terminal 700a. Accordingly, the structure of the ground terminal 700a according to the first modified example is a structure which may greatly reduce an amount of scraps of the sheet metal material.

Figure 16:
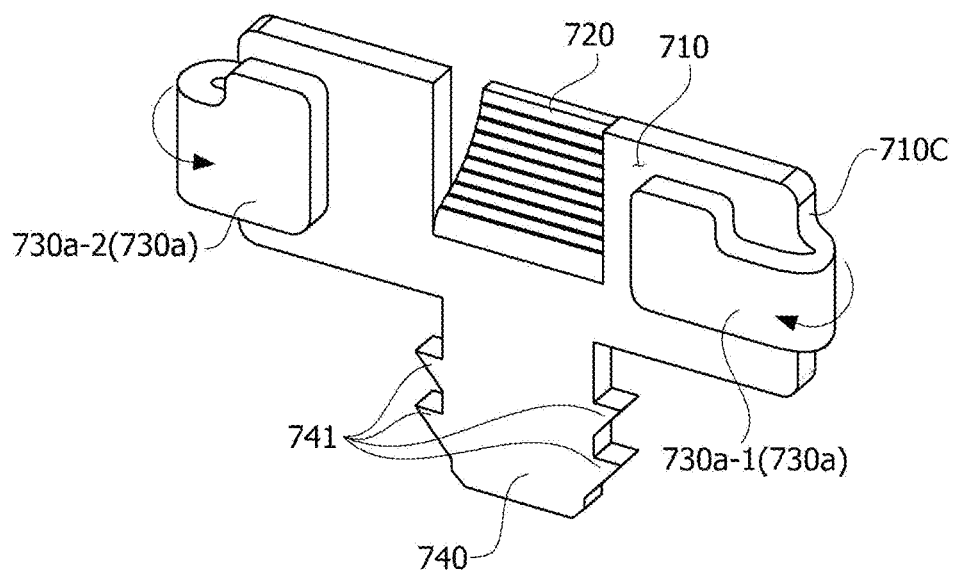
FIG. 16 is a view illustrating a second modified example of the ground terminal according to the second embodiment.

FIG. 16 is a view illustrating a second modified example of the ground terminal according to the second embodiment.

Referring to FIG. 16, in a ground terminal 700a according to the second modified example, a first clip 730a-1 and a second clip 730a-2 may be bent from side ends 710C of a body unit 710. Corresponding to the ground terminal 700a having such a structure, a connection direction of a wire 610 connected to the first clip 730a-1 and the second clip 730a-2 may be changed from an upward direction to a downward direction with respect to the ground terminal 700a, or from the downward direction to the upward direction with respect to the ground terminal 700a. The ground terminal 700a according to the second modified example may be applied according to a structure of a cover plate 100 and a type and position of a capacitor 600.

Figure 17:
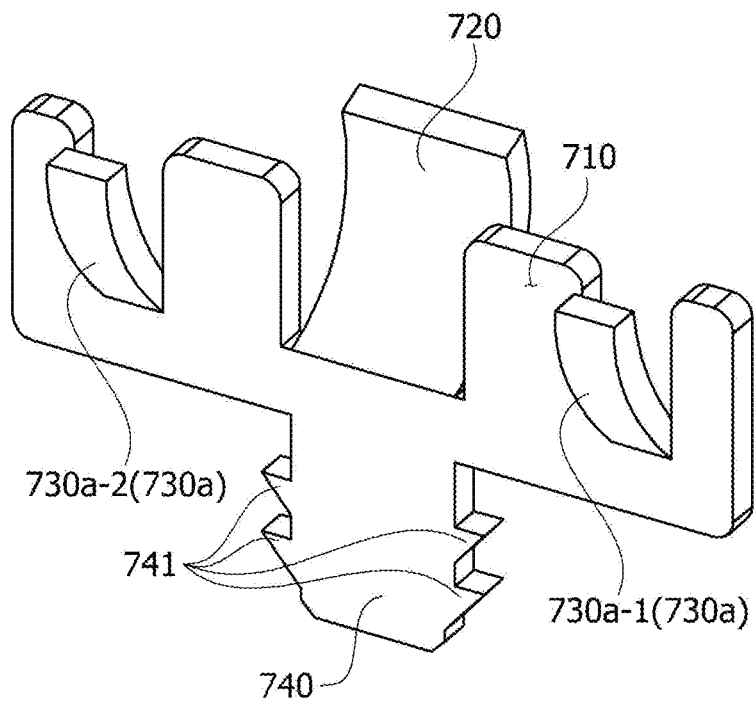
FIG. 17 is a view illustrating a third modified example of the ground terminal according to the second embodiment.

FIG. 17 is a view illustrating a third modified example of the ground terminal according to the second embodiment.

Referring to FIG. 17, in a ground terminal 700a according to the third modified example, a first clip 730a-1 and a second clip 730a-2 may be formed by bending a cut portion in which a part of a body unit 710 is cut. Since the first clip 730a-1 and the second clip 730a-2 are implemented in the body unit 710 in the exploded shape of the ground terminal 700a, the amount of scraps of the sheet metal material may be greatly reduced.

Although the above-described descriptions are described with reference to the embodiments of the present invention, it should be understood that those skilled in the art may be capable of variously modifying and changing within the spirit and the scope of the present invention disclosed in the claims which will be described below. Further, differences related to modifications and changes should be understood to be included in the scope of the present invention defined in the appended claims.

EXPLANATION OF REFERENCE NUMERALS

1: motor, 2, 2a: cover assembly, 10: housing, 20: stator, 30: rotor, 40: rotating shaft, 50: commutator, 60: bearing, 100: cover plate, 110: boss unit, 120: coupling groove, 130: guide groove, 200: connector, 210: terminal, 300: brush assembly, 400: choke coil, 500: stator, 600: capacitor, 610: wire, 700, 700a: ground terminal, 710: body unit, 720: ground unit, 730, 730a: clip unit, 740: coupling unit, 741: protrusion

The invention claimed is:

1. A ground terminal comprising:
a body unit comprising a top, a bottom opposite from the top, a first side, and a second side opposite from the first side;

a ground unit extending from the top;
a coupling unit extending from the bottom; and
a clip unit extending from the first side and the second side;
wherein the ground unit is curved away from the body unit in a first direction,
wherein a first portion of the first side and a second portion of the second side of the body unit are bent in a second direction to form the clip unit, the second direction being opposite to the first direction, and
wherein the clip unit is configured to have a wire inserted therein.

2. The ground terminal of claim 1, wherein the clip unit comprises a first clip disposed at the first side of the body unit and a second clip disposed at the second side of the body unit.

3. The ground terminal of claim 2, wherein the first and second clips are bent from the top of the body unit.

4. The ground terminal of claim 3, wherein the first and second clips are bent from the bottom of the body unit.

5. The ground terminal of claim 2, wherein the first and second clips are bent from a first distal end and a second distal end, respectively, of the body unit, the first distal end being opposite from the second distal end.

6. The ground terminal of claim 2, wherein the first and second clips are formed by bending the first and second portions, respectively, of the body unit.

7. The ground terminal of claim 1, wherein the ground unit is formed at a center of the body unit in a width direction.

8. The ground terminal of claim 1, wherein the coupling unit comprises a front surface that is disposed entirely in a same plane as the front face of the body unit and a back surface that is disposed entirely in a same plane as the back face of the body unit.

9. The ground terminal of claim 8, wherein the coupling unit comprises at least one protrusion having a sawtooth shape.

10. The ground terminal of claim 1, wherein the coupling unit comprises a plurality of protrusions each having a sawtooth shape.

11. A cover assembly comprising:
a cover plate;
a brush assembly coupled to the cover plate;
a ground terminal coupled to the cover plate; and
a capacitor coupled to the cover plate and connected to the ground terminal and the brush assembly;
wherein the ground terminal comprises:
a body unit comprising a top, a bottom opposite from the top, a first side, and a second side opposite from the first side;
a ground unit extending from the top;
a coupling unit extending from the bottom; and
a clip unit extending from the first side and the second side;
wherein the ground unit is curved away from the body unit in a first direction,
wherein a first portion of the first side and a second portion of the second side of the body unit are bent in a second direction to form the clip unit, the second direction being opposite to the first direction,
wherein the clip unit is configured to have a wire inserted therein, and
wherein the coupling unit comprises at least one protrusion.

12. The cover assembly of claim 11, wherein the cover plate comprises a coupling groove that is concavely formed and into which the coupling unit is inserted.

13. The cover assembly of claim 12, wherein the cover plate comprises a guide groove configured to guide coupling of the ground terminal when the coupling unit is coupled to the coupling groove.

14. The cover assembly of claim 11, comprising a connector to which an external power source is connected, wherein a terminal disposed in the connector is electrically connected to the capacitor.

15. The cover assembly of claim 14, wherein the terminal is disposed to pass through the cover plate.

16. The cover assembly of claim 11, wherein the at least one protrusion comprises a plurality of protrusions each having a sawtooth shape.

17. A motor comprising:
a rotating shaft;
a rotor coupled to the rotating shaft;
a commutator coupled to the rotating shaft;
a stator disposed inside the rotor;
a housing disposed at an outside of the stator; and
a cover assembly that covers the housing,
wherein the cover assembly comprises a brush assembly in contact with the commutator, a capacitor connected to the brush assembly, and a ground terminal connected to the capacitor,
wherein the ground terminal comprises:
a body unit comprising a top, a bottom opposite from the top, a first side, and a second side opposite from the first side;
a ground unit extending from the top;
a coupling unit extending from the bottom; and
a clip unit extending from the first side and the second side;
wherein the ground unit is curved away from the body unit in a first direction,
wherein a first portion of the first side and a second portion of the second side of the body unit are bent in a second direction to form the clip unit, the second direction being opposite to the first direction,
wherein the clip unit is configured to have a wire inserted therein, and
wherein the coupling unit comprises at least one protrusion.

18. The motor of claim 17, wherein the at least one protrusion comprises a plurality of protrusions each having a sawtooth shape.

* * * * *